US011623478B2

(12) United States Patent
Buresh et al.

(10) Patent No.: US 11,623,478 B2
(45) Date of Patent: Apr. 11, 2023

(54) TIRE WITH IMPROVED SNOW PERFORMANCE WITHOUT SACRIFICING DRY BRAKING OR WEAR

(71) Applicant: COMPAGNIE GENERALE DES ETABLISSMENTS MICHELIN, Clermont-Ferrand (FR)

(72) Inventors: Patrick Jon Buresh, Bend, OR (US); Jason Schoenmaker, Simponville, SC (US); Robert Dillon, Piedmont, SC (US); Phillip William Check, Simpsonville, SC (US); William Marshall Thompson, Simpsonville, SC (US)

(73) Assignee: COMPAGNIE GENERALE DES ETABLISSMENTS MICHELIN, Clermont-Ferrand (FR)

( * ) Notice: Subject to any disclaimer, the term of this patent is extended or adjusted under 35 U.S.C. 154(b) by 325 days.

(21) Appl. No.: 16/959,056

(22) PCT Filed: Dec. 30, 2017

(86) PCT No.: PCT/US2017/069137
§ 371 (c)(1),
(2) Date: Jun. 29, 2020

(87) PCT Pub. No.: WO2019/133007
PCT Pub. Date: Jul. 4, 2019

(65) Prior Publication Data
US 2020/0338930 A1    Oct. 29, 2020

(51) Int. Cl.
*B60C 11/03*    (2006.01)
*B60C 9/20*     (2006.01)
(Continued)

(52) U.S. Cl.
CPC ............ *B60C 11/0304* (2013.01); *B60C 9/20* (2013.01); *B60C 11/0306* (2013.01);
(Continued)

(58) Field of Classification Search
CPC ............... B60C 11/0008; B60C 11/005; B60C 2011/0025
See application file for complete search history.

(56) References Cited

U.S. PATENT DOCUMENTS

2012/0085471 A1    4/2012   Horiguchi
2013/0153100 A1    6/2013   Piffard et al.
(Continued)

FOREIGN PATENT DOCUMENTS

CN    104884273 A    9/2015
CN    106660405 A    5/2017
(Continued)

OTHER PUBLICATIONS

International Search Report w Written Opinion for PCT/US2017/069137 dated Sep. 11, 2018.
(Continued)

*Primary Examiner* — Cedrick S Williams
(74) *Attorney, Agent, or Firm* — Hahn Loeser & Parks LLP; Bret A. Hrivnak (57) ABSTRACT

Embodiments of the disclosure include pneumatic tires having improved snow performance. Said tires include a cap ply extending at least partially across a full width of at least one of the belt plies and having a rupture force greater than 210 N per 15 mm of cap ply width. A shoulder rib includes a compliance groove or sipe extending primarily in a circumferential direction and to a depth equal to or less than 75% of the skid depth. The lateral sipes and grooves are arranged to provide an average lateral feature spacing of less than 15 mm. The average inclination angle for the lateral
(Continued)

grooves is greater than 6 degrees in the shoulder ribs and is greater than 20 degrees in the central ribs. A longitudinal non-lateral sipe edge density is greater than 21.1 micrometers/mm². A longitudinal lateral sipe edge density for all lateral sipes is greater than 5.5 micrometers/mm².

17 Claims, 6 Drawing Sheets

(51) Int. Cl.
    *B60C 11/12*     (2006.01)
    *B60C 11/13*     (2006.01)
(52) U.S. Cl.
    CPC ...... *B60C 11/1204* (2013.01); *B60C 11/1236* (2013.01); *B60C 11/1392* (2013.01); *B60C 2011/0372* (2013.01); *B60C 2011/0383* (2013.01); *B60C 2011/129* (2013.01); *B60C 2011/1254* (2013.01)

(56) References Cited

U.S. PATENT DOCUMENTS

| | | | |
|---|---|---|---|
| 2014/0230980 | A1 | 8/2014 | Guichon et al. |
| 2015/0321519 | A1 | 11/2015 | Obana |

FOREIGN PATENT DOCUMENTS

| | | | |
|---|---|---|---|
| DE | 11201007267 | T5 | 9/2015 |
| DE | 112012007265 | T5 | 5/2022 |
| EP | 0402303 | A1 | 12/1990 |
| EP | 0439238 | A2 | 7/1991 |
| EP | 0543661 | A1 | 5/1993 |
| EP | 2505386 | A1 | 10/2012 |
| JP | H04100707 | A | 4/1992 |
| JP | H07276924 | A | 10/1995 |
| JP | 4008013 | B1 | 1/2008 |
| JP | 2009542528 | A | 12/2009 |
| JP | 2016124438 | A | 7/2016 |
| WO | 2013048682 | A1 | 4/2013 |
| WO | 2015193805 | A1 | 12/2015 |
| WO | 2017/115195 | A1 | 6/2017 |

OTHER PUBLICATIONS

International Search Report w Written Opinion for PCT/US2017/069141 dated Oct. 31, 2018.
ASTM International Designation: F1805-12; Standard Test Method for Single Wheel Driving Traction in a Straight Line or Snow- and Ice-Covered Surfaces; no dated listed.
General Motors Engineering Publication PPG 11681, Prediction of Half-Depth Snow Traction Using Tread Geometry; Jun. 15, 1987.
SAE Technical Papers Series, General Motors 800836, Prediction of Driving Traction Performance on Snow; Jun. 9-13, 1980.

TIRE WITH IMPROVED SNOW PERFORMANCE WITHOUT SACRIFICING DRY BRAKING OR WEAR

FIELD

Embodiments of this disclosure relate generally to pneumatic tires.

BACKGROUND

In the design of pneumatic tires, it is desirous to achieve any of a variety of performance parameters. It is often the case that to achieve certain performance goals, other performance measures are sacrificed. In particular instances, in providing elevated snow and wear performance, a reduction in wet and dry grip has been required. Accordingly, there is a need to provide elevated snow and wear performance without sacrificing wet and dry grip.

SUMMARY

Embodiments of the disclosure include a pneumatic tire. In particular embodiments, the tire comprises: a pair of annular bead areas spaced apart axially along a rotational axis of the tire; a pair of sidewalls spaced apart axially along the rotational axis of the tire, each sidewall of the pair of sidewalls extending outwardly in a radial direction from one bead area of the pair of bead areas relative to the rotational axis; and, a crown portion arranged widthwise between the pair of sidewalls and extending annularly around the tire. The crown portion including a tread formed of elastomeric material arranged annularly around the crown portion and forming an outer, ground-engaging side upon which the tire is intended to roll upon, the tread having a thickness extending radially and a width extending axially, the tread forming a wearing portion the tire. The crown portion further including one or more belt plies each forming a layer of elastomeric material reinforced with a plurality of elongate reinforcements spaced apart in an array, the one or more belt plies being arranged radially inward and below the tread. The crown portion further including a pair of shoulders, each shoulder forming a portion of the crown arranged adjacent to each sidewall. The crown portion further including a cap ply arranged radially outward from the one or more belt plies and between the tread and the one or more belt plies, the cap ply extending at least partially across a full width of at least one of the belt plies and being arranged at least partially within each shoulder, the cap ply forming a layer of elastomeric material reinforced with a plurality of elongate reinforcements spaced apart in an array, the cap ply being characterized as having a rupture force greater than 210 N per 15 mm of cap ply width. The tread including a plurality of tread features extending a depth within the tread thickness which includes lateral sipes, lateral grooves, and longitudinal grooves, the longitudinal grooves arranged to form a plurality of ribs, each rib extending annularly around the tread and where adjacent ribs are separated by one of the longitudinal grooves, the plurality of ribs including a pair of shoulder ribs and a plurality of central ribs, each of the shoulder ribs arranged along one of opposing widthwise extents of the outer, ground-engaging side and within one of the shoulders and where the plurality of central ribs are arranged between the pair of shoulder ribs. The plurality of tread features extending into the tread thickness substantially to a depth defining a skid depth of the tread, the skid depth being the thickness of the tread intended to be worn during the intended life of the tire tread. One of the shoulder ribs includes an elongate compliance feature comprising a groove or a sipe, the elongate compliance feature extending primarily in a circumferential direction of the tire and into the tread thickness to a depth equal to or less than 75% of the skid depth of the tread at the location of the elongate compliance feature. For the outer, ground-engaging side, the lateral sipes and lateral grooves are arranged to provide an average lateral feature spacing of less than 15 mm. An average inclination angle for the lateral grooves is greater than 6 degrees in the shoulder ribs and is greater than 20 degrees in the central ribs. A longitudinal non-lateral sipe edge density for all lateral grooves, longitudinal grooves, and the elongate compliance feature is greater than 21.1 micrometers/mm². A longitudinal lateral sipe edge density for all lateral sipes is greater than 5.5 micrometers/mm². It is appreciated that other variations of the tire may vary by incorporating more or less features as described hereinafter in any combination or by varying the present features as described hereinafter.

The foregoing and other objects, features, and advantages will be apparent from the following more detailed descriptions of particular embodiments, as illustrated in the accompanying drawings wherein like reference numbers represent like parts of particular embodiments.

DETAILED DESCRIPTION OF THE DRAWINGS

DETAILED DESCRIPTION OF PARTICULAR EMBODIMENTS

The present disclosure provides tires characterized as having elevated snow and wear performance that not only fail to sacrifice wet and dry performance but also improve wet and dry performance, neither which has been previously achieved.

For purposes of describing the invention, reference will now be made to particular exemplary embodiments, one or more examples of which are illustrated in particular figures, or in association with particular figures. Each example is provided by way of explanation of the invention, not limitation of the invention. In fact, it will be apparent to those skilled in the art that various modifications and variations can be made in the present invention without departing from the scope or spirit of the invention. For instance, features or steps illustrated or described as part of one embodiment, can be used with the features or steps of another embodiment to yield other embodiments or methods. Thus, it is intended that the present invention covers such modifications and variations as come within the scope of the appended claims and their equivalents.

The following terms are defined as follows for this disclosure:

"Axial direction" or the letter "$A_d$" in the figures refers to a direction parallel to the axis of rotation A of the tire or tire carcass, and its components, such as the outer band and inner hub, when rolling along a ground surface. "Lateral direction" or "widthwise direction" or the letter $LAT_d$ is synonymous with axial direction $A_d$.

"Radial direction" or the letter "$R_d$" in the figures refers to a direction that is orthogonal to the axial direction and extends in the same direction as any radius that extends orthogonally from the axial direction. "Radially inward" means in the radial direction $R_d$ towards rotational axis A. "Radially outward" means in the radial direction $R_d$ away from the rotational axis A.

"Circumferential direction," or the letter "$C_d$" in the figures, refers to a direction that is orthogonal to the axial direction and orthogonal to a radial direction. The circumferential direction is the direction of the tire along which it rolls or rotates and that is perpendicular to the axis of rotation of the tire. The circumferential direction is also referred to as a longitudinal direction $LONG_d$.

A "groove" is any elongate void or channel arranged within the tread having a pair of opposing sidewalls extending depthwise into the tread and that which are spaced apart greater than 1.6 mm or, in other variations, by at least 2.0 mm or otherwise by an average distance as measured between the sidewalls for the entire depth of the groove that is greater than 1.6 mm or by 2.0 mm or more. A groove is designed to have a width, based upon the depth of the groove, to remain open as the tread rolls into, through, and out of a contact patch. A "lateral groove" is a groove that extends in a direction oblique to the longitudinal direction (the circumferential direction). A "longitudinal groove" is a groove that extends substantially in the longitudinal direction. A "circumferential groove" is synonymous with a longitudinal groove, each of which extends annularly around the tire.

A "sipe" is any elongate void or incision arranged within the tread having a pair of opposing sidewalls extending depthwise into the tread and that which are spaced apart by less than 2.0 mm or 1.6 mm or less in other variations or otherwise by an average distance as measured between the sidewalls for the entire depth of the groove that is less than 2.0 mm or 1.6 mm or less. Sidewalls of the sipe come into contact from time to time as the tread rolls into and out of the contact patch of the tire as the tire rolls on the ground. By lateral sipe, it is meant a sipe that extends in a direction that is oblique to the longitudinal direction.

A "tread element" is portion of the tread defined by one or more grooves and/or sipes arranged along the outer, ground-engaging side of the tread. Examples of tread elements include tread blocks and ribs.

A "rib" is a tread element that runs substantially in the longitudinal direction $L_d$ of the tire and that is bounded by a pair of longitudinal grooves or by a longitudinal groove and any of the pair of lateral sides defining a width of the tread. A rib may include any lateral features, which includes any lateral grooves and lateral sipes, as well as any arrangement of tread blocks.

A "tread block" is a tread element having a perimeter that is defined by one or more grooves with or without a lateral side of the tread, thereby creating an isolated structure in the tread. A sipe does not define any portion of a tread block perimeter.

A "contact patch" is the total area contained within a perimeter defining an area of contact, the area of the contact patch including the area of contact contained within the perimeter and any void arranged within the area of contact.

"Elastic material" or "elastomer" as used herein refers to a polymer exhibiting rubber-like elasticity, such as a material comprising rubber, whether natural, synthetic, or a blend of both natural and synthetic rubbers.

"Elastomeric" as used herein refers to a material comprising an elastic material or elastomer, such as a material comprising rubber.

"Modulus of elongation" (MPa) was measured at 10% strain (MA10), at 100% strain (MA100), or at 300% strain (MA300) at a temperature of 23° C. based on ASTM Standard D412 on dumb bell test pieces. The measurements were taken in the second elongation; i.e., after an accommodation cycle. These measurements are secant moduli in MPa, based on the original cross section of the test piece.

Hysteresis or hysteretic loss is denoted as P60 and is measured as a percentage rebound at the sixth rebound at 60° C., in accordance with the following equation:

$$HL(\%)=100\times((W0-W1)/W1),$$

in which W0 is the energy supplied and W1 is the energy returned. P60 is obtained through a P8 test that employs a pendulum that is permitted to repeatedly strike and rebound from a test sample.

"Resilient" as used herein means configured to bend and flex elastically without plastic or permanent deformation under intended operating conditions.

"Rigid" as used herein means generally unable to elastically or plastically bend or be forced out of shape under intended operating conditions, as opposed to being resilient.

Cords are said to be inextensible when the said cords under a tensile force equal to 10% of the rupture force, exhibit a strain of at most 0.2%. Cords are said to be elastic when the said cords are under a tensile force equal to the rupture load exhibit a strain of at least 3% with a maximum tangent modulus of less than 150 GPa (gigapascals). As far as the metal cords or threads are concerned, the "rupture force" (maximum load in N (Newtons)), rupture strength (in MPa (megapascals)) and elongation at break (total elongation in %) measurements are taken under tensile load in accordance with standard ISO 6892, 1984 at a temperature of 23° C.

Figure 4:
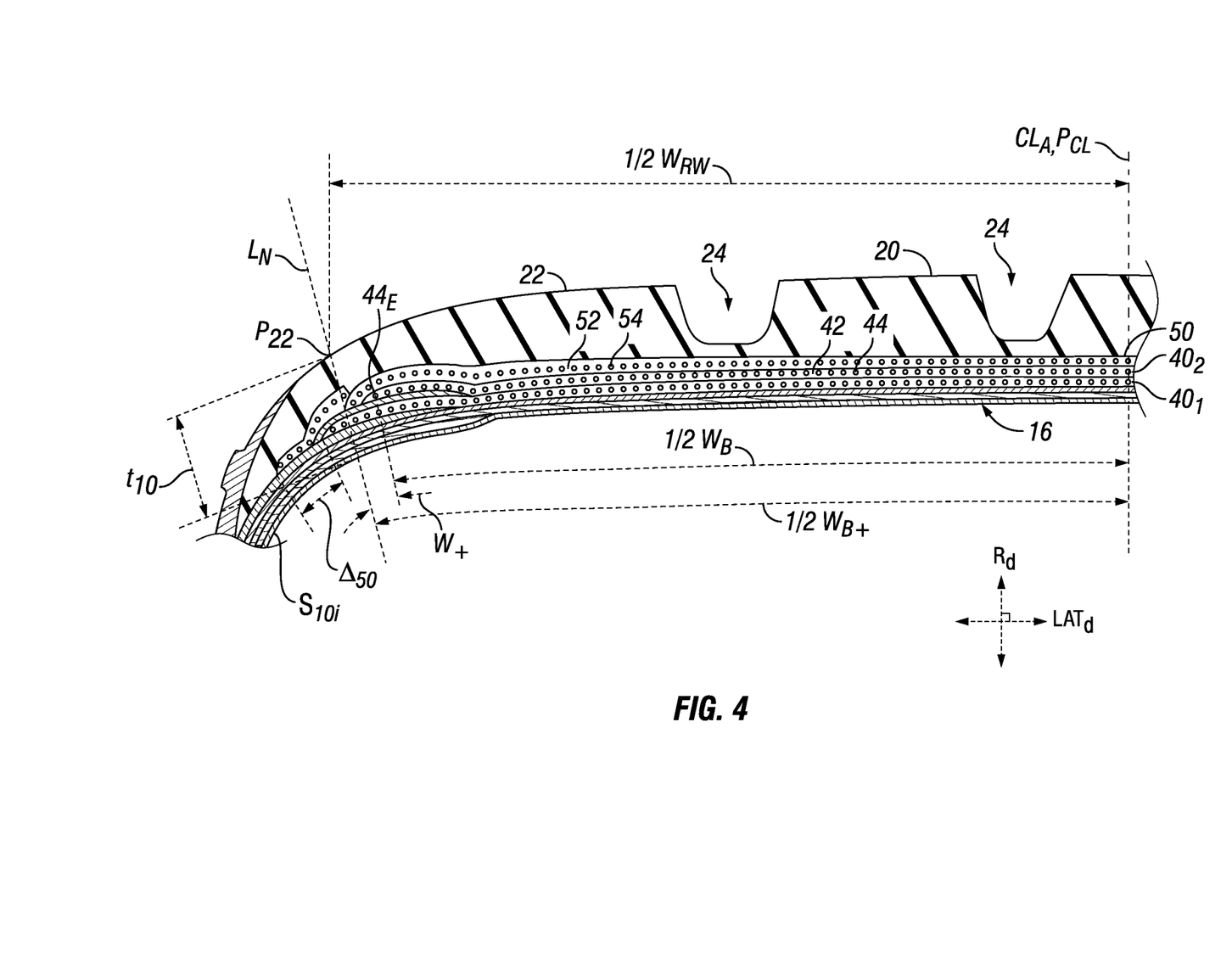
FIG. 4 is a sectional view of the tire shown in FIG. 1, showing how to measure rolling width.

"Rolling width," with reference to FIG. 4, refers to a width $W_{RW}$ of the tread 20 that defines a width of the outer, ground-engaging side 22 of the tread 20. This width $W_{RW}$ is defined in accordance with FIG. 4, whereby a distance $W_B$ is measured along the radially outermost belt ply $40_2$ to the center of the last elongate reinforcement 44 in said ply $40_2$ at each widthwise extent of said outermost belt ply $40_2$. In this instance, ½ of $W_B$ is shown. Upon obtaining this dimension, an additional 3 mm (millimeters) is added to each widthwise extent of $W_B$ (6 mm in total) along the same curvilinear path along which $W_B$ extends, where the 3 mm addition is represented by $W_+$. An imaginary line $L_N$ extending normal to the curvilinear path along which $W_{B+}$ extends at each widthwise extent of $W_{B+}$ intersects the outer, ground-engaging side 22 at point $P_{22}$. At each lateral side of the tread, opposing points $P_{22}$ as measured in the lateral direction $LAT_d$ define the rolling width $W_{RW}$ of the tread 20 and outer, ground-engaging side 22, where in FIG. 4 one half (½) of $W_{RW}$ is shown.

"Skid depth" or $SD_{20}$ is defined as the thickness of the tread extending from the outer, ground-engaging side of the tread to the deepest tread feature (that is, any longitudinal or lateral groove or sipe) extending into the tread. Any thickness of the tread extending radially inward from the skid depth is referred to as the undertread thickness. In particular instances, with reference to FIG. 1, the skid depth $SD_{20}$ extends along a curvilinear path laterally across the tread and between adjacent longitudinal grooves 24, intersecting each longitudinal groove bottom 26 and extending further along an arcuate path into each shoulder rib $32_{S1}$, $32_{S2}$ at the depth of the deepest lateral groove or sipe, where the skid depth $SD_{20}$ may or may not be arranged substantially the same distance from the radially outermost cap ply 50 or, if no cap ply is present, the radially outermost belt ply 40 for distance $W_B$. The skid depth $SD_{20}$ defines the useful thickness of the tread intended to be worn during the life of the tire.

Figure 6:
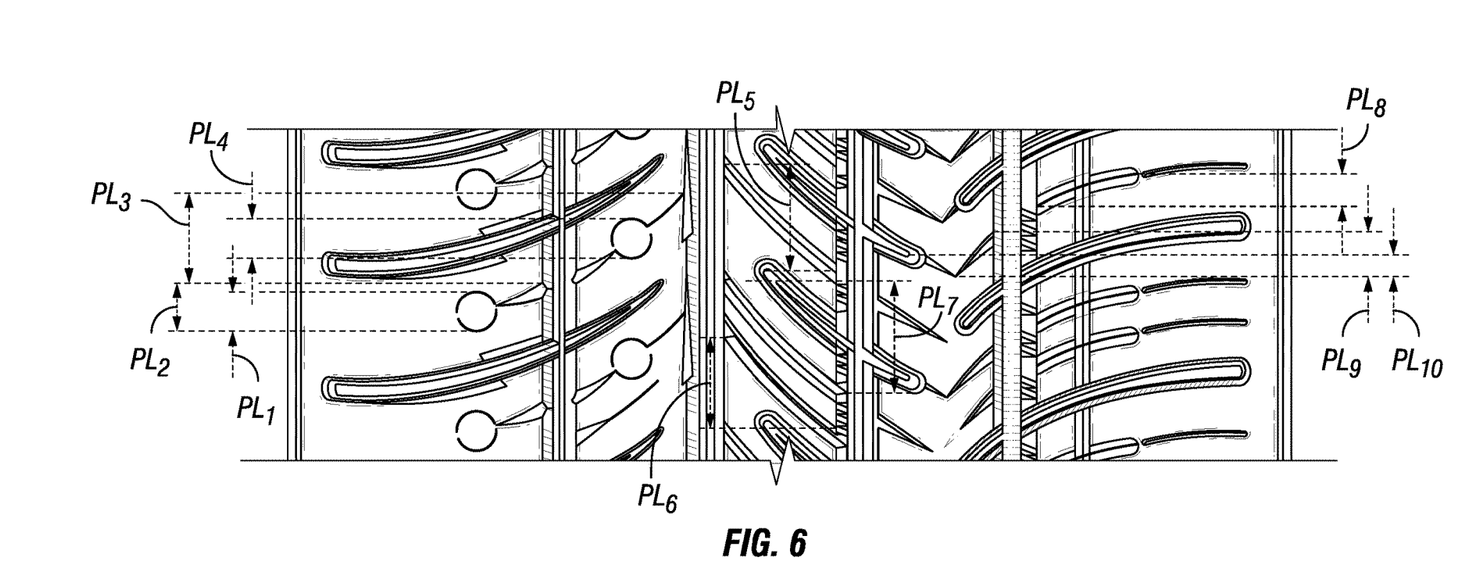
FIG. 6 is a top view of the tread shown in FIG. 2 that includes exemplary projected longitudinal lengths for the lateral sipes as used to determine lateral sipe edge density.

"Projected longitudinal length" is the length of a longitudinal groove, lateral groove, lateral sipe, or elongate compliance feature projected perpendicular to the direction of rotation, that is, the longitudinal component of the length, which by nature extends entirely in a longitudinal direction of the tire/tread. By way of example, with reference to FIG. 6, exemplary projected longitudinal lengths PL ($PL_1$ through $PL_{10}$) for lateral sipes 30 are shown, where each projected longitudinal length PL forms the X component (which forms the vector component extending in the longitudinal direction) of the lateral sipe length, the projected longitudinal length extending in the longitudinal direction $LONG_d$, where the lateral sipe length is separated into vectors extending separately in the longitudinal direction $LONG_d$ and in the lateral direction $LAT_d$. While FIG. 6 shows the projected longitudinal lengths for sipes 30, projected longitudinal lengths for each of the longitudinal grooves 24, lateral grooves 28, and elongate compliance features 34 are determined in the same manner. It is noted that for the longitudinal grooves 28 and elongate compliance feature 34, as each extend annularly in the embodiment shown and described in FIG. 2, the projected longitudinal lengths for each extend the full annular distance around the tire. It is appreciated that each projected longitudinal length may be based upon the length of the widthwise centerline of each corresponding groove or sipe, or, instead, upon any edge extending along any side forming the width of each groove or sipe.

"Longitudinal non-lateral sipe edge density" is the sum of all projected longitudinal lengths of all longitudinal grooves, lateral grooves, and elongate compliance grooves and sipes as described herein, which extend substantially in the longitudinal direction of the tire, divided by the total surface area of the tread as defined by the rolling width.

"Longitudinal lateral sipe edge density" is the sum of all projected longitudinal lengths of the lateral sipes in a tire divided by the total surface area of the tread as defined by the rolling width.

"Longitudinal contact surface ratio" (longitudinal CSR) is the contact surface ratio of the longitudinal grooves. This is the total area contained within a contact patch ($A_c$) minus the total projected void area of the longitudinal grooves ($A_{long}$) as located along the outer, ground-engaging side of the tire tread, which extends annularly around the tire and laterally along the rolling width of the outer, ground-engaging side divided by the total area of the contact patch ($A_c$) that which includes the total projected void area of the longitudinal grooves ($A_{long}$). Both areas are measured in $mm^2$. This relationship can be expressed in terms of the following equation: Longitudinal $CSR=(A_c-A_{long})/A_c$, where the equation yields a dimensionless number.

The "maximum tan delta" dynamic properties for the rubber compositions were measured at 23° C. on a Metravib Model VA400 ViscoAnalyzer Test System in accordance with ASTM D5992-96. The response of a sample of vulcanized material (double shear geometry with each of the two 10 mm diameter cylindrical samples being 2 mm thick) was recorded as it was being subjected to an alternating single sinusoidal shearing stress at a frequency of 10 Hz under a controlled temperature of 23° C. Scanning was effected at an amplitude of deformation of 0.05 to 50% (outward cycle) and then of 50% to 0.05% (return cycle). The maximum value of the tangent of the loss angle tan delta (max tan δ) was determined during the return cycle.

Dynamic properties "Tg" and "G*" for the rubber compositions were measured on a Metravib Model VA400 ViscoAnalyzer Test System in accordance with ASTM D5992-96. The response of a sample of vulcanized material (double shear geometry with each of the two 10 mm diameter cylindrical samples being 2 mm thick) was recorded as it was being subjected to an alternating single sinusoidal shearing stress of a constant 0.7 MPa and at a frequency of 10 Hz over a temperature sweep from −60° C. to 100° C. with the temperature increasing at a rate of 1.5° C./min. The dynamic shear modulus G* at 60° C. was captured and the temperature at which the max tan delta occurred was recorded as the glass transition temperature, Tg.

Use is made of an oscillating consistometer as described in Standard ASTM D1646 (1999). The "Mooney plasticity" or "Mooney viscosity" measurement is carried out according to the following principle: the sample, analyzed in the uncured state (i.e., before curing) is molded in a cylindrical chamber heated to a given temperature (for example 100° C.). After preheating for one minute, the rotor rotates within the test specimen at 2 revolutions/minute and the working torque for maintaining this movement is measured after rotating for 4 minutes. Mooney viscosity (ML 1+4) is expressed in "Mooney unit" (MU, with 1 MU=0.83 newton-meter N-m). For greater readability, the results will be shown in base 100, the value 100 being assigned to the control. A result of less than 100 will indicate a decrease in the value concerned and, conversely, a result of greater than 100 will indicate an increase in the value concerned.

To measure the "cornering stiffness," each tire is run at a constant speed of 80 km/h on an appropriate automatic machine (machine of the "flat track" rolling road type marketed by the company MTS), by varying the load denoted "Z", which is a vertical or radial load. under a drift angle of 1 degree, and the drift thrust was measured continuously to identify the drift thrust or cornering stiffness denoted "D" (corrected for the drift thrust at zero drift angle), by using sensors to record the transverse load on the wheel as a function of this load "Z", this then gives the drift thrust or cornering stiffness.

Figure 1:
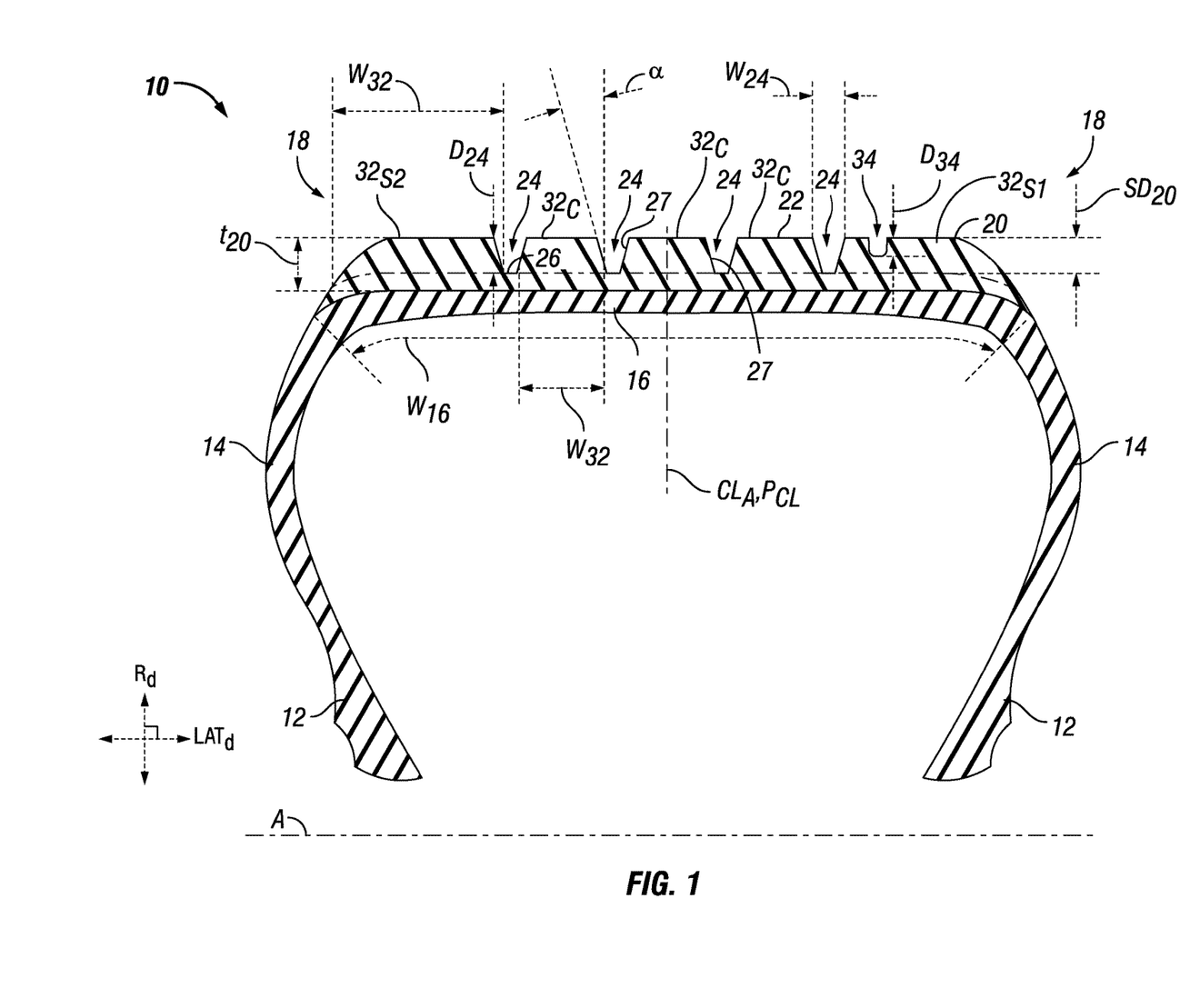
FIG. 1 is a sectional view of a tire taken along a plane extending in both a radial direction and an axial direction, the plane extending through the rotational axis, in accordance with an exemplary embodiment.

With reference to FIG. 1, a pneumatic tire 10 is shown to generally comprise a pair of annular bead areas 12 spaced apart axially (that is, in axial direction $A_d$) along a rotational axis A of the tire 10, a pair of sidewalls 14 spaced apart axially along the rotational axis A of the tire 10, and a crown portion 16 arranged widthwise between the pair of sidewalls 14 and extending annularly around the tire 10. Each sidewall 14 extends outwardly in a radial direction $R_d$ from one bead area 12 of the pair of bead areas 12 relative to the rotational axis A. In extending widthwise between the pair of sidewalls 14, it is a width $W_{16}$ of the crown portion 16 extending between the sidewalls. Rolling width of the tread 20 and outer, ground-engaging side 22 is also shown. Shoulder area is generally designated as 18, and includes shoulder ribs $32_{S1}$, $32_{S2}$.

With continued reference to FIG. 1, the crown portion 16 includes a tread 20 arranged annularly around the crown portion 16 and forming an outer, ground-engaging side 22 upon which the tire 10 is intended to roll upon. The tread 20 has a thickness $t_{20}$ extending in a direction perpendicular to the outer, ground-engaging side 22 and in a direction toward the rotational axis A of the tire. The tread thickness $t_{20}$ extends from the outer, ground-engaging side 22 to a skid depth $SD_{20}$ of the tread to define a thickness of the tread intended to be worn during the lifetime of the tire (that is, a wearing depth or thickness of the tire tread). The skid depth $SD_{20}$ is commonly, but not necessarily, arranged at a depth corresponding to the bottom 26 of the deepest longitudinal groove 24. While not necessary, it is commonly the case, such as is shown, where the bottom 26 of all circumferential (longitudinal) grooves 24 is arranged at the skid depth $SD_{20}$. In such instances, while each circumferential (longitudinal) groove depth $D_{24}$ may or may not be of the same depth $D_{24}$, in the exemplary embodiment shown, all circumferential grooves 24 are of equal depth $D_{24}$ and extend to and terminate at the skid depth $SD_{20}$. In certain instances, the average depth $D_{24}$ for all circumferential grooves 24 is 8.5 mm. This average is calculated over the full circumference of the tire 10. In particular instances, the skid depth $SD_{20}$ is measured at a widthwise (axial) centerline $CL_A$ of the tread 10, the centerline $CL_A$ extending along an equatorial plane $P_{CL}$, where at this location the skid depth $SD_{20}$ is 8.5 mm, but may remain the same or vary across the width of the tread. For example, in the FIG. 1 the skid depth $SD_{20}$ remains generally constant until reaching each shoulder 18, while in FIG. 4 the skid depth $SD_{20}$ gradually decreases as the tread extends laterally along its width. It is noted that the tread thickness $t_{20}$ may extend radially inward deeper to a depth beyond the skid depth $SD_{20}$, such as is generally shown.

In any embodiment contemplated herein, the tread 20 is formed of an elastomeric material, such as any natural or synthetic rubber, or any blend thereof. In particular instances, the tread is substantially formed of an elastomeric material to provide elevated traction (grip) and which is characterized as having a glass transition temperature (Tg) of −25° C. to −10° C., a maximum tan delta of 0.4 to 0.6, a dynamic shear modulus (G*) of 1.0 to 1.4 MPa, a Mooney viscosity of 80 to 120, and a modulus of elongation (MA10) of 5.75 to 9.5. An elastomeric material so characterized may formed using any of a variety of formulations. In particular instances, the so characterized elastomeric material is a mixture including an elastomer, a filler, and a plasticizer. In this formulation, the elastomer ranges from an SBR/BR blend containing at least 70% SBR to 100% SBR, or in other variations a 70/30 or 85/15 blend of SBR and BR, respectively. "SBR" means styrene-butadiene rubber while "BR" means butadiene rubber. SBR is a functionalized elastomer. The filler in this formation comprises silica and carbon black, silica forming 23.5% to 25.9% and the carbon black forming 1% of the total elastomeric material mixture. The plasticizer in this formation forms 25% to 30% of the total elastomeric material mixture and comprising high Tg resin that forms 12% to 23% of the total elastomeric material mixture and highly oleic sunflower oil that forms the balance of the plasticizer (2% to 18%). It is appreciated that other formations may be employed to achieve the desired characteristics and properties.

The elastomers useful for forming the elastomeric material compositions disclosed herein, such as for the tread 20, may have any microstructure, such microstructure being a function of the polymerization conditions used, in particular of the presence or absence of a modifying and/or randomizing agent and the quantities of modifying and/or randomizing agent used. The elastomers may, for example, be block, random, sequential or micro-sequential elastomers, and may be prepared in dispersion or in solution; they may be coupled and/or starred or alternatively functionalized with a coupling and/or starring or functionalizing agent.

Functionalized rubbers, i.e., those appended with active moieties, are well known in the industry. The backbone or the branch ends of the elastomers may be functionalized by attaching these active moieties to the ends of the chains or to the backbone or mid-chains of the polymer. Exemplary functionalizing agents that could be included with the diene elastomers include, but are not limited to, metal halides, metalloid halides, alkoxysilanes, imine-containing compounds, esters, ester-carboxylate metal complexes, alkyl ester carboxylate metal complexes, aldehydes or ketones, amides, isocyanates, isothiocyanates and imines—all of these being well-known in the art. Particular embodiments may include functionalized diene elastomers while other embodiments may be limited to including no functionalized elastomers.

Particular embodiments include at least 80 phr of a functionalized elastomer or alternatively at least 90 phr or 100 phr of a functionalized elastomer wherein the functional moiety interacts with the silica filler. Examples known in the art include silanol functional groups or polysiloxane functional groups having a silanol end (such as described, for example, in FR 2 740 778 or U.S. Pat. No. 6,013,718), alkoxysilane groups (such as described, for example, in FR 2 765 882 or U.S. Pat. No. 5,977,238), carboxyl groups (such as described, for example, in WO 01/92402 or U.S. Pat. No. 6,815,473, WO 2004/096865 or US 2006/0089445) or else polyether groups (such as described, for example, in EP 1 127 909 or U.S. Pat. No. 6,503,973), wherein each of these mentioned documents are hereby incorporated herein by reference.

Particular embodiments of the rubber compositions disclosed herein are limited to those having at least 80 phr of the rubber components being highly unsaturated diene elastomers. Other embodiments are limited to having at least 90 phr or 100 phr of the highly unsaturated diene elastomer components.

Examples of suitable highly unsaturated diene elastomers include, but are not necessarily limited to natural rubber (NR) and synthetic rubbers such as polybutadienes (BR), polyisoprenes (IR), butadiene copolymers, isoprene copolymers and mixtures of these elastomers. Such copolymers include butadiene/styrene copolymers (SBR), isoprene/butadiene copolymers (BIR), isoprene/styrene copolymers (SIR) and isoprene/butadiene/styrene terpolymers (SBIR). Any of these examples or mixtures of these examples are suitable for particular embodiments of the rubber compositions disclosed herein.

In particular embodiments, useful SBR elastomers may have a bound styrene content of between 1 mol % and 45 mol % or alternatively between 15 mol % and 40 mol % or between 20 mol % and 30 mol %. Particular embodiments of the rubber compositions disclosed herein include an SBR that is functionalized with a moiety that interacts with the silica filler.

With reference to FIG. 4, the crown portion 16 further includes one or more belt plies 40 (generally, while more specifically showing first and second belt plies $40_1$, $40_2$) each forming a layer of elastomeric material 42 reinforced with a plurality of elongate reinforcements 44 spaced apart in an array, the one or more belt plies being arranged radially inward and below the tread. Together, the one or more belt plies form a "belt," the belt also being referred to as a "belt structure" and forming an annular structure formed by all of the one or more belt plies 40). Each elongate reinforcement 44 may be formed of metal or non-metal elongate reinforcements, where the elongate reinforcements 44 are formed of a plurality of filaments arranged lengthwise and twisted along their lengths as desired. Metal elongate reinforcements are constructed from filaments most commonly formed of steel, but may be formed any metal having desirous properties. Non-metal reinforcements are constructed from filaments formed of any fabric or textile, such as polyester, rayon, nylon, aramid, silk, and/or fiberglass. In the exemplary embodiment shown, the tire 10 includes a pair of belt plies 40 to form an annular belt structure, although any single belt ply 40 or three or more belt plies 40 may be employed to achieve the desired properties of the annular belt structure formed by any one or more belt plies 40.

In particular embodiments, each elongate reinforcement 44 is characterized as having a rupture force ranging from 420 to 520 N. The elongate reinforcements 44 are arranged to extend lengthwise greater than 24 degrees and up to 32 degrees relative to the longitudinal direction $LONG_d$, and in other instances 26 degrees to 30 degrees, or substantially 28 degrees relative to the longitudinal direction $LONG_d$. For example, this characterization may be achieved by forming each of the elongate reinforcements 44 form a 0.60 mm thick steel cable. The cable is formed of two (2) twisted 0.3 mm diameter steel filaments. Each such elongate reinforcement 44 is characterized as having a 470 N rupture force. The plurality of elongate reinforcements 44 in each of the one or more belt plies 40 are spaced apart centerline-to-centerline by substantially 1 mm with the elastomeric material 42 of each of the one or more belt plies, which defines the pace of the elongate reinforcements 44. The elastomeric material 42 has a thickness of 1.08 mm, and is characterized as having a modulus of elongation of less than 10.5 and loss due to hysteresis (P60) at 60 degrees of less than 26.5 as measured as a result of conducting a P8 pendulum test. Together with the elastomeric material 42, which settles in between the spaced-apart elongate reinforcements 44, each belt ply 40 before application to the tire in an uncured state has a thickness of 1.22 mm (where belt ply used for prior high performance passenger tire was 1.42 mm thick). In sum, the mass of each belt ply 40 is reduced 5.5% (reduced from 2.531 kg/mm$^2$ to 2.394 kg/mm$^2$) relative to belt plies previously used in related passenger (high performance) tires. Even though more elongate reinforcements 44 are included within any give size belt ply 40 due to the reduced pace, the additional elongate reinforcements do not offset the mass reduction achieved by reducing the elongate reinforcement diameter (which also permits a reduction in elastomeric material 42). As noted previously, a reduced hysteretic elastomeric material 42 may be employed, which in certain exemplary instances is characterized as having a hysteresis (P60) of less than 26.5, 23.5 or less, 17.5 to 23.5, or of substantially 20.5. In particular embodiments, elastomeric material 42 is characterized as having a hysteresis (P60) of substantially 20.5 and a modulus of elongation (MA10) substantially 6 MPa, which is contrasted with elastomeric material used in belt plies of prior high performance passenger tires was characterized as having a hysteresis (P60) of substantially 26.5 and a modulus of elongation (MA10) substantially 10.5 MPa. In combination with other features described herein, it is appreciated that differently characterized elongate reinforcements 44 and/or differently characterized elastomeric material 42 may be employed.

With continued reference to FIG. 4, the crown portion 16 further includes a cap ply 50 arranged radially outward from the one or more belt plies 40 and from the annular belt structure formed by all belt plies contained within the tire. The cap ply 50 is arranged between the tread 20 and the one or more belt plies 40 (that is, belt). The cap ply 50 extends at least partially or substantially across a full width of at least one of the belt plies 40 or more generally at least partially or substantially across a full width of the belt. In doing so, the cap ply 50 is at least partially arranged within each shoulder 18 or shoulder rib $32_{S1}$, $32_{S2}$. The cap ply 50 is provided to recover rigidity otherwise reduced by the tread design (arrangement of tread features). The provision of the cap layer 50 described herein may be provided as a substitute to other cap layers previously employed by other tires or added to tires not previously incorporating a cap layer.

The cap ply 50 is formed of a layer of elastomeric material 52 reinforced with a plurality of elongate reinforcements 54 spaced apart in an array. The elongate reinforcements 54 are arranged to extend lengthwise substantially in a circumferential direction $C_d$ of the tire, that is, in a direction substantially parallel to a plane $P_{CL}$ bisecting the tire at its equatorial centerline $CL_A$ and extending perpendicular to rotational axis A. "Substantially parallel" means that any such elongate reinforcement 54 extends by an angle or 0 to 5 degrees in absolute value (that is, spanning −5 degrees to 5 degrees) relative to the longitudinal direction $LONG_d$ or plane $P_{CL}$.

Cap ply 50 may be applied in any desired manner. For example, in certain exemplary instances, cap ply 50 is formed using one or more sheets wound once around the tire, the sheets including the elastomeric material 52 and elongate reinforcements 54, while in other exemplary instances the cap ply 50 is formed using one or more strips wound multiple revolutions around the tire in a helical configuration, the strips including the elastomeric material 52 and elongate reinforcements 54. In winding into a helical configuration, each wind of the strip is arranged to abut the adjacent wind of strip, or, in other variations, may be spaced apart from or overlap an adjacent wind by as much as a 50% (providing a spacing or overlap, where, for example, a 50% overlap forms ½ pace between winds of the strip). It is appreciated that one or more cap plies 50 may be employed. At each widthwise end of the belt, before beginning the helical wind at one end and after reaching the other end after making the plurality of helical winds, a full revolution of the cap strip is made. In doing so, the cap ply extends 4 mm to 14 mm beyond the belt, that is, beyond the widest of the one or more belt plies 40 at each widthwise extent of the belt.

Each elongate reinforcement 54 may be formed of metal or non-metal elongate reinforcements, where elongate reinforcements are formed of a plurality of filaments arranged lengthwise and twisted along their lengths as desired. Metal elongate reinforcements are constructed from filaments most commonly formed of steel, but may be formed any metal having desirous properties. Non-metal reinforcements are constructed from filaments formed of any fabric or textile, such as polyester, rayon, nylon, aramid, silk, and/or fiberglass. In certain exemplary instances, the cap ply is characterized as having a rupture force greater than 3150 N per 15 mm of cap ply width, while in other instances the cap ply is characterized as having a rupture force ranging from 4650 N to 6150 N per 15 mm of cap ply width or substantially 5400 N per 15 mm of cap ply width. In any such embodiment, the cap ply may also be characterized as having a 4% elongation per 15 mm of cap ply width with application of a 100 N tensile force, and as having a 5.5% elongation per 15 mm of cap ply width with application of a 200 N tensile force. In particular embodiments, with reference to FIG. 4, for example, cap ply 50 is formed using a strip, such as a 15 mm wide strip, wound in a helical configuration fully across and beyond a full width of each of the pair of belt plies 40, where each wind of the strip abuts an adjacent wind of the strip and extends by a distance $\Delta 50$ of less than 15 mm beyond the full width of the widest belt ply 40 or of the annular belt structure at each widthwise extent in certain exemplary instances.

An exemplary elongate reinforcement 54 that may be employed within any such contemplated cap ply 50, including any cap sheet or cap strip used to form such ply, is characterized as having a rupture force ranging from 310 N to 410 N. In more specific instances, each elongate reinforcement 54 is characterized as having a rupture force substantially equal to 360 N, where such elongate reinforcements 54 arranged in an array having a 1 mm pace, where pace is the centerline-to-centerline spacing between adjacent elongate reinforcements 54. When using fifteen (15) elongate reinforcements 54 characterized as having a rupture force substantially equal to 360 N to form a 15 mm wide cap strip with a pace of 1 mm, the rupture force of the 15 mm wide strip is 5400 N and is characterized as having an elongation of 4% as measured at 100 N force and as having an elongation of 5.5% as measured at 200 N force. While other elastomeric material may be employed, in certain instances elastomeric material used to form any cap ply 50 or cap strip contemplated above may be characterized as follows in Table 1:

TABLE 1

| Property | Desired Range | Embodiment A |
| --- | --- | --- |
| MA10 | 5.8 to 7.8 MPa | 6.8 MPa |
| MA100 | 3.2 to 4.0 MPa | 3.6 MPa |
| MA300 | 3.4 to 4.2 MPa | 3.8 MPa |
| Hysteresis Loss, P60 | 18 to 23% | 20.5% |

In any such embodiment, for any cap ply 50 or cap strip contemplated herein, each elongate reinforcement 54 is formed of a two (2) yarn twist, where an aramid 167 filament is twisted with a nylon 140 filament at a rate of 290 turns per meter. In such instances, the rupture force for each elongate reinforcement is 360 N.

For any belt or cap ply formed of elastomeric material having elongate reinforcements, the array of elongate reinforcements may be coated with the elastomeric material or skim (layers) of elastomeric may be applied to opposing sides of the array. It is appreciated, however, that any other manner may be employed for providing any such ply.

In the prior art tire, a full-width cap layer is applied to a pair of belt plies, the cap layer being formed of elongate reinforcements that are formed of nylon. These prior art elongate reinforcements are characterized as having a 210 N rupture force, and when arranged in a 15 mm wide cap ply strip having a pace of 1 mm, the strip has a rupture force of 3150 N. Also, the cap ply is applied in a Z-configuration, where a cap ply strip is initially applied inward from an intended widthwise extent of the cap ply, the strip being wound outwardly to the nearest widthwise side, such as by two helical winds, for example, and then is wound helically in an abutting arrangement in a lateral direction across the tire to form a full width of the cap ply, and thereafter winding the strip back in towards away from the widthwise extent, such as by two helical winds, to complete the Z-configuration. As a result, the prior art cap layer is less rigid in both circumferential and in the axial directions. By employing a more rigid cap layer 50 as discussed herein, cap layer 50 overcomes the loss in rigidity provided by the more flexible and compliant tread 20 as achieved by the particular arrangement tread features. Specifically, the cap layer 50 described herein provides an increase in rigidity in the lateral (Y) direction, for improved D(Z) gain (in cornering stiffness) and for improved handling. The cap layer 50 described herein also provides an increase in rigidity in the longitudinal (X) direction, for improved wear and dry braking performance. It is also noted that the pair of prior art belt plies each employ elongate reinforcements each having a rupture force of 875 N and are arranged to extend lengthwise by 24 degrees relative to the longitudinal direction of the tire, where the prior art elongate reinforcements are steel cables formed of four (4) 0.30 mm diameter steel filaments twisted.

Figure 2:
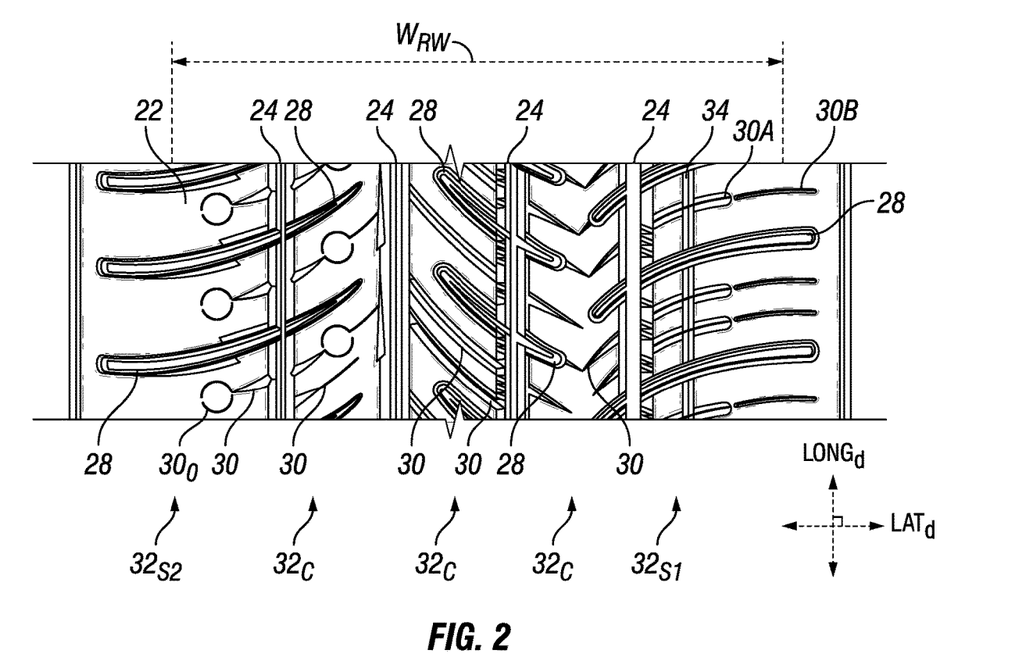
FIG. 2 is a top view of a portion of the tire tread shown in FIG. 1, in accordance with an exemplary embodiment.

With reference to FIGS. 1 and 2, the tire tread 20 includes a plurality of features extending a depth within the tread thickness that include longitudinal (circumferential) grooves 24, lateral grooves 28, and lateral sipes 30. These features are arranged along the outer, ground-engaging side 22, although any such feature may be submerged below the outer, ground-engaging side 22 to be later exposed after a particular depth of the tread 20 has been worn away. In the embodiment shown, the longitudinal grooves 24 are arranged to form a plurality of ribs 32, each rib extending annularly around the tread such that adjacent ribs are separated by one of the longitudinal grooves 24. The plurality of ribs include a first shoulder rib $32_{S1}$, a second shoulder rib $32_{S2}$, and a plurality of central ribs $32_C$. Each of the first and second shoulder ribs $32_{S1}$, $32_{S2}$ are arranged along one of opposing widthwise extents of the outer, ground-engaging side 22, where the plurality of central ribs $32_C$ are arranged axially (laterally) between the first and second shoulder ribs $32_{S1}$, $32_{S2}$. Generally, in combination with the different embodiments contemplated herein, each of the ribs $32_{S1}$, $32_{S2}$, $32_C$ may be characterized as having any desired width, where the rib widths $W_{32}$ may be the same or different between the ribs $32_{S1}$, $32_{S2}$, $32_C$. In particular instances, each of the first and second shoulder ribs have a width $W_{32}$ equal to 24% to 29% of the tread width. Further, in certain instances, the width $W_{32}$ of each first and second shoulder rib $32_{S1}$, $32_{S2}$ has a width $W_{32}$ equal to 150% to 170% of an average width of the central ribs $32_C$, $32_{S2}$. While the average width $W_{32}$ of each central rib $32_C$ may be different than any one or more of the other central ribs $32_C$, in particular instances the average width $W_{32}$ of each central rib is substantially the same. It is appreciated that while any number of ribs may be employed, in certain embodiments the tread has 5 ribs (shown) or 6 ribs (not shown). In the embodiment shown, the tire tread features form an asymmetrical, non-directional tire tread pattern design, where non-directional means that the tire may be mounted in to rotate in either of opposing circumferential directions. It is appreciated, however, that a directional tread pattern design may also be employed.

With reference to FIGS. 1 and 2, it is also noted that longitudinal grooves 24 each has a width $W_{24}$ defined by a pair of opposing groove sidewalls 27. It is appreciated that each of the longitudinal grooves 24 may have the same of different widths $W_{24}$, and in particular embodiments the longitudinal groove widths $W_{24}$ are selected to provide the longitudinal contact surface ratios discussed elsewhere herein. While each groove sidewall 27 may extend into the tread thickness $t_{20}$ at any angle α relative to a direction perpendicular to the outer, ground-engaging side 22, in particular exemplary instances each groove sidewall 27 extends at an angle α measuring 2° to 12° relative to a direction perpendicular to the outer, ground-engaging side 22. As noted previously, each longitudinal groove 24 has a depth $D_{24}$ extending into the tread thickness to a bottom 26, where all of the longitudinal grooves may be of the same or different depth $D_{24}$.

With continued reference to FIG. 2, it is noted as well that tread 20 includes lateral grooves 28 and lateral sipes 30, all of which together are referred to as lateral features. It is noted that should any adjacent lateral features be arranged within 1 mm of one another, the adjacent features are considered a single feature. For example, with reference to "0" lateral sipe $30_O$, in the embodiment shown it is optionally formed from two separate arcs that are arranged within 1 mm of one another, so it is considered a single lateral feature. Likewise, the arrangement of lateral sipe $30_A$ and of lateral sipe $30_B$ is considered to form a single lateral features, as each are arranged adjacent to one another within 1 mm. It is appreciated that, in lieu of providing a "0" lateral sipe $30_O$, an elongate lateral sipe, such as any straight, curvilinear, or undulating sipe, may be substituted there for, although lateral sipe $30_O$ provides a double projected lateral length as defined herein. While the depths of the lateral grooves 28 and lateral sipes 30 may vary, in particular embodiments, the lateral grooves 28 and lateral sipes 30 extend substantially the full skid depth $SD_{20}$ of the tread 20.

Figure 7:
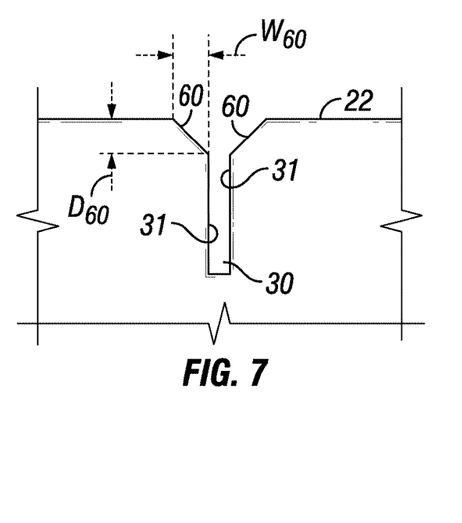
FIG. 7 is a sectional view of a lateral sipe in FIG. 2.

With general reference to FIG. 2, it is appreciated that each lateral feature (lateral grooves 28 and lateral sipes 30) may include a chamfer arranged at the intersection of a lateral feature 28, 30 (a sidewall thereof) with the outer, ground-engaging side 22. With specific reference now to FIG. 7, by way of example, a lateral sipe 30 is shown to include a pair of opposing sipe sidewalls 31, each sipe sidewall 31 extending in the direction of the sipe length and the pair of sidewalls 31 defining a width of the sipe 30, which may be zero (0) when the lateral sipe 30 is a laceration. With continued reference to FIG. 7, a chamfer 60 is arranged to form an intersection between the lateral sipe sidewall 31 and the outer, ground-engaging side 22. While the chamfer 60 may be any size, in particular embodiments, the chamfer is a 1.5 mm by 1.5 mm chamfer, which extends a depth $D_{60}$ of 1.5 mm into the tread thickness $t_{20}$ and a distance $W_{60}$ of 1.5 mm in a direction normal to the sipe sidewall or to the length of the sipe 30. Arranging chamfers 60 on these lateral features provide additional tread compliance in the lateral direction. In the prior art tread shown in FIG. 3, no lateral sipes are chamfered—only lateral grooves 128 are chamfered. Accordingly, in the various embodiments of the tread contemplated herein, in addition to chamfering lateral grooves 28, lateral sipes 30 are also chamfered to increase the density of chamfered lateral features to improve lateral compliance for improved snow performance. In chamfering any lateral feature, it is appreciated that any one or both sidewalls of the lateral feature may be chamfered along any partial or full length of the lateral feature. For example, in certain instances a majority of the lateral grooves 28 and at least 50% of the lateral sipes 30 along the outer, ground-engaging 22 side within the rolling width $W_{RW}$ include a chamfer 60 extending along at least a portion of the corresponding groove or sipe length. In other instances, substantially all (substantially 100%) of the lateral grooves 28 and substantially all (substantially 100%) of the lateral sipes 30 include a chamfer 60 extending along at least a portion of the corresponding groove or sipe length. While each of these different variations may be employed in any embodiment contemplated herein in which any combination of features are included, it is particularly noted that these different variations may be combined with the various sipe densities and edge densities.

In any embodiment contemplated herein, an average inclination angle is contemplated for the lateral grooves. In particular embodiments, such as in the tread of FIG. 2, the average inclination angle Ψ (see FIGS. 5A and 5B) for each of the lateral grooves 28 in each of the shoulder ribs $32_{S1}$, $32_{S2}$ is greater than 6 degrees and in certain exemplary embodiments may range from 8 to 14 degrees or from 10 to 12 degrees. In such embodiments, the average inclination angle Ψ (see FIGS. 5A and 5B) for each of the lateral grooves 28 in the central ribs $32_C$ is greater than 20 degrees while in certain exemplary embodiments may range from 30 to 45 degrees or from 33.5 to 42 degrees. In more specific instances, the average inclination angle Ψ for shoulder ribs $32_{S1}$, $32_{S2}$ is 12 degrees while the average inclination angle Ψ for central ribs $32_C$ is 37 degrees. It is appreciated that within any such range, the average angle may be the same or vary amongst the shoulder ribs $32_{S1}$, $32_{S2}$ and amongst the central ribs $32_C$.

Figure 5A:
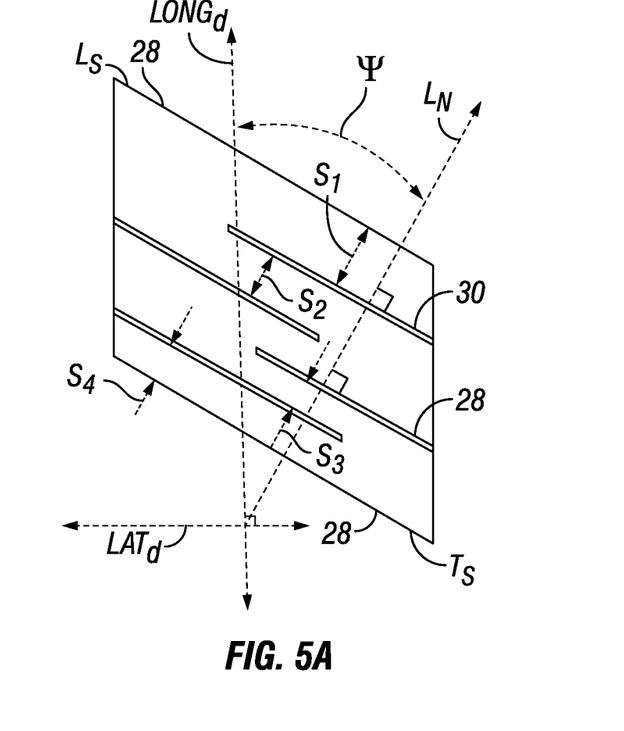
FIG. 5A is a top view of a tread block showing how to measure average inclination angles of lateral grooves and spacings between lateral features.
Figure 5B:
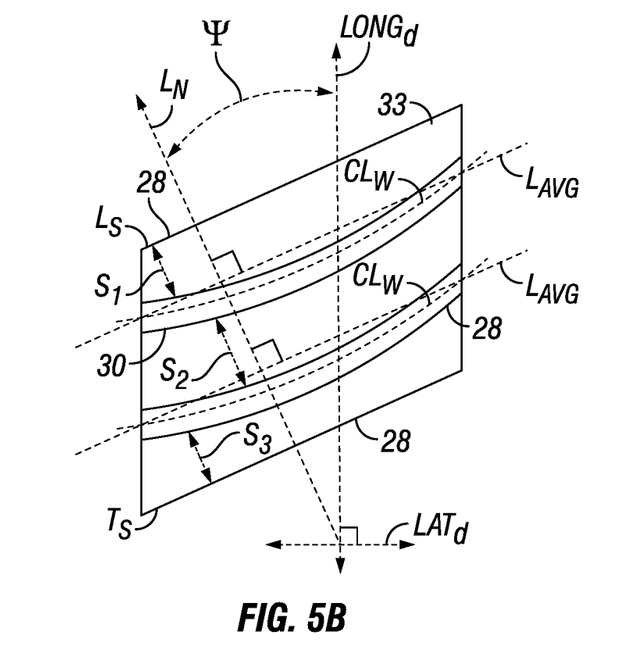
FIG. 5B is a top view of a tread block also showing how to measure average inclination angles of lateral grooves and spacings between lateral features.

With reference to FIGS. 5A and 5B, these angles Ψ may be measured relative to the longitudinal direction $LONG_d$, where angle Ψ is measured between the longitudinal direction $LONG_d$ and a line $L_N$ extending normal to the groove length $L_{28}$. In FIG. 5A, each lateral groove 28 extends linearly. In FIG. 5B, where each lateral groove extends lengthwise along a curvilinear path, the average angle may be measured differently. For example, in the figure shown, the average angle Ψ is obtained by extending an imaginary line $L_{avg}$ from the terminal ends of the lateral groove length $L_{28}$ at a widthwise centerline $CL_W$ of the lateral groove 28, where the terminal ends here are arranged at each lateral side of the tread block although in other variations a lateral groove may terminate inward of any side edge of the tread block. In other instances, an imaginary line $L_{avg}$ may be determined using linear regression taking into account the lengthwise path of the longitudinal groove widthwise centerline $CL_W$. Once the imaginary line $L_{avg}$ is determined, angle Ψ is measured relative to a line $L_N$ extending normal therefrom. In other variations, angle Ψ may be measured relative to the lateral direction $LAT_d$ from a linear longitudinal groove length $L_{28}$ or from the imaginary line $L_{avg}$.

In any embodiment contemplated herein, an average spacing (density) is contemplated for all lateral features, that is, all lateral grooves 28 and all lateral sipes 30. Specifically, with reference to FIGS. 5A and 5B, a spacing S ($S_1$, $S_2$, $S_3$, $S_4$) is provided between adjacent lateral features 28, 30, whether adjacent lateral features form a pair of lateral grooves 28, a pair of lateral sipes 30, or a lateral groove 28 and a lateral sipe 30. It is noted that LS identifies a leading side of the tread block shown as formed by a lateral groove, while TS identifies a trailing side of the tread block as formed by a lateral groove. While the spacings S are shown to be constant, spacings S may be variable in other instances. In particular embodiments, such as in the tread of FIG. 2, the average lateral feature spacing for each of the lateral features 28, 30 in each of the shoulder ribs $32_{S1}$, $32_{S2}$ is less than 15 mm, while in certain instances the average lateral feature spacing may range from 12 mm to 14.5 mm, while in more specific instances the average lateral feature spacing is substantially 13.7. It is appreciated that within any such range, the average angle may be the same or vary amongst the various ribs $32_{S1}$, $32_{S2}$, and $32_C$.

With reference to FIGS. 5A and 5B, these spacings S are measured relative to the longitudinal direction $Long_d$, where spacing S is measured in the direction of a line $L_N$ extending normal to the lateral feature length $L_{28}$, $L_{30}$. In FIG. 5A, each lateral feature 28, 30 extends linearly. In FIG. 5B, where each lateral groove extends lengthwise along a curvilinear path, the spacing S ($S_1$, $S_2$, $S_3$) is measured in a direction defined by a line $L_N$ extending normal to an imaginary line $L_{avg}$ extending through the terminal ends of the lateral groove length $L_{28}$ at a widthwise centerline $CL_W$ of the lateral groove 28, where the terminal ends here are arranged at each lateral side of the tread block although in other variations a lateral groove may terminate inward of any side edge of the tread block. In other instances, an imaginary line $L_{avg}$ may be determined using linear regression taking into account the lengthwise path of the longitudinal groove widthwise centerline $CL_W$. Once the imaginary line $L_{avg}$ is determined, the spacings $S(S_1, S_2, S_3)$ are measured in the direction of line $L_N$ extending normal to line $L_{avg}$.

It is appreciated that each of the tread features, that is, each of the longitudinal grooves 24, lateral grooves 28, lateral sipes 30, and compliance features 34 (partial depth grooves or sipes extending substantially in the longitudinal direction $LONG_d$) form edges located at the intersection of the depthwise extension of each such tread feature and the outer, ground-engaging side 22. In other words, an edge is formed where any sidewall of any lateral sipe or of any lateral groove intersects the outer, ground-engaging side. As noted previously, some of these tread features may include one or more chamfers 60, and so the edges may be arranged at the intersection of the chamfer with the outer, ground-engaging side 22. In any event, as described above in conjunction with FIG. 6, a longitudinal lateral sipe edge density may be determined for the lateral sipes 30, while a longitudinal non-lateral sipe edge density may be determined collectively for the other tread features, namely, for all longitudinal grooves 24, lateral grooves 28, and the elongate compliance features 34 (that is, all partial depth grooves or sipes extending in the longitudinal direction), in combination. In combination with any embodiment contemplated herein, the longitudinal non-lateral sipe edge density is greater than the prior art tire 110 shown in FIG. 3, that is, greater than 21.1 micrometers/mm$^2$, while in more specific instances this longitudinal edge density ranges from 28 to 45 micrometers/mm$^2$ or is 37.9 micrometers/mm$^2$. In the same or different instances, the longitudinal lateral sipe edge density is greater than the prior art tire 110 shown in FIG. 3, that is, greater than 5.5 micrometers/mm$^2$, while in more specific instances longitudinal edge density ranges from 7 to 11 micrometers/mm$^2$ or is 9.5 micrometers/mm$^2$.

In particular instances, to provide improved lateral crown flexibility and compliance may be provided by arranging an elongate compliance feature 34 along any one or both of the shoulder ribs $32_{S1}$, $32_{S2}$. In the embodiment shown in FIG. 2, an elongate compliance feature 34 is arranged along inner shoulder rib $32_{S1}$. An elongate compliance feature 34 extends lengthwise substantially in a longitudinal direction $LONG_d$ of the tire 10 and into the tread thickness $t_{20}$ to a depth $D_{34}$ equal to or less than 75% or 25% to 75% of the skid depth $SD_{20}$ at the location of the elongate compliance feature or of any longitudinal groove depth $D_{24}$. In any event, elongate compliance feature 34 does not extend as deep as any longitudinal groove 24 (that is, depth $D_{24}$ is always greater than depth $D_{34}$). It is appreciated that the elongate compliance feature depth $D_{34}$ may remain constant or vary along its length. In the embodiment shown, the elongate compliance groove depth $D_{34}$ remains constant. In extending substantially in the longitudinal direction $LONG_d$, elongate compliance feature 34 extends lengthwise along its length at an average angle of 15 to −15 degrees relative to the longitudinal direction $LONG_d$. Accordingly, in these variations, elongate compliance feature 34 may extend lengthwise along a linear path in the longitudinal direction $LONG_d$ (that is, along a path extending annularly around the tread within a plane arranged parallel to plane $P_{CL}$), or lengthwise along a non-linear path (that is, along a path that extending annularly around the tread only partially within a plane arranged parallel to plane $P_{CL}$)) and therefore may extend annularly around the tread 20 or may extend discontinuously from tread block to tread block, such as when the elongate compliance groove 34 extends lengthwise at an angle biased to the longitudinal direction $LONG_d$. In the embodiment shown, elongate compliance feature 34 extends linearly along an annular path in the circumferential direction $C_d$ around the tread 20. Elongate compliance feature 34 also has a width $W_{34}$ extending between opposing sidewalls 35. While the width may be any desired width, in the embodiment shown, the groove width $W_{34}$ is 1 to 3 mm wide. Therefore, elongate compliance feature 34 may form a sipe or a groove.

As defined above, longitudinal contact surface ratio (longitudinal CSR) associates the total area of the outer, ground-engaging side minus all void present along the outer, ground-engaging side provided by all circumferential grooves with the total area arranged along the outer, ground-engaging side 22 in the form of a ratio. The total area of the outer, ground-engaging side 22 includes both the surface area of the tread and all void arranged along the outer, ground-engaging side, represented as surface area void along the outer, ground-engaging side. In particular instances, for any embodiment of the tread contemplated herein, the tread may be characterized as having a longitudinal contact surface ratio of 0.75 to 0.80.

In particular instances, for any embodiment of the tread contemplated herein, the total volumetric void contained in the tread in an unworn state is 0.3 to 0.33.

Figure 3:
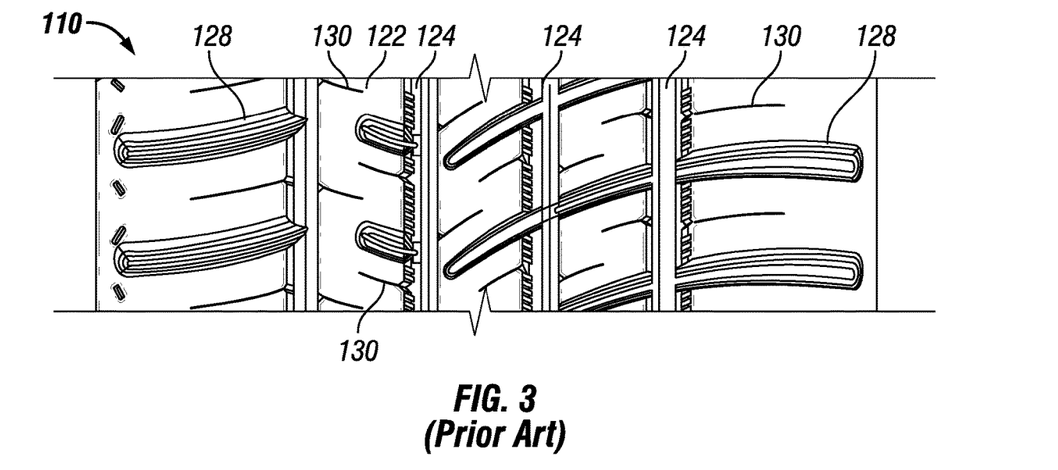
FIG. 3 is a top view of a portion of a prior art tire tread.

With regard to the prior art tread design shown in FIG. 3, it is noted that the prior art tread 120 is characterized as having a sipe density of 15.1, which is less than the sipe density described for the treads described herein. Also, the prior art tread 120 is characterized as having lateral features that are arranged at a lower average angle relative to the longitudinal direction $LONG_d$, which more specifically provides an average lateral feature angle of 6 degrees in the shoulder ribs and an average lateral feature angle of 20 degrees in the central ribs. While both the prior art and the new tread designs include chamfers on lateral grooves all lateral grooves, no lateral sipes in the prior art tread design include chamfers. Additionally, no elongate compliance feature is included in the prior art tread design. By virtue of employing the features described in association with the tread 20 shown in FIG. 2 and the treads described in association therewith, an increase in edges in both the circumferential direction and axial direction provide improved snow traction while also reducing the rigidity in the axial direction for improved snow handling. However, reduction in axial rigidity can penalize wet/dry handling. Additionally, the increase in sipe density (providing more closely spaced sipes) can reduce dry braking performance.

Also, by providing tread material according to the formulations discussed above for improving traction performance can reduce the rigidity of the tread, thereby penalizing wear and handling performance. Still, by incorporating the unique combination of tread features discussed herein together with the tread material formulations and crown constructions, such as by using particular cap layer constructions to recover rigidities reduced in each of the longitudinal and lateral directions, in addition to improvements in snow performance, dry performance is maintained and not reduced while wear performance is improved. These results are surprising and unexpected.

Figure 8:
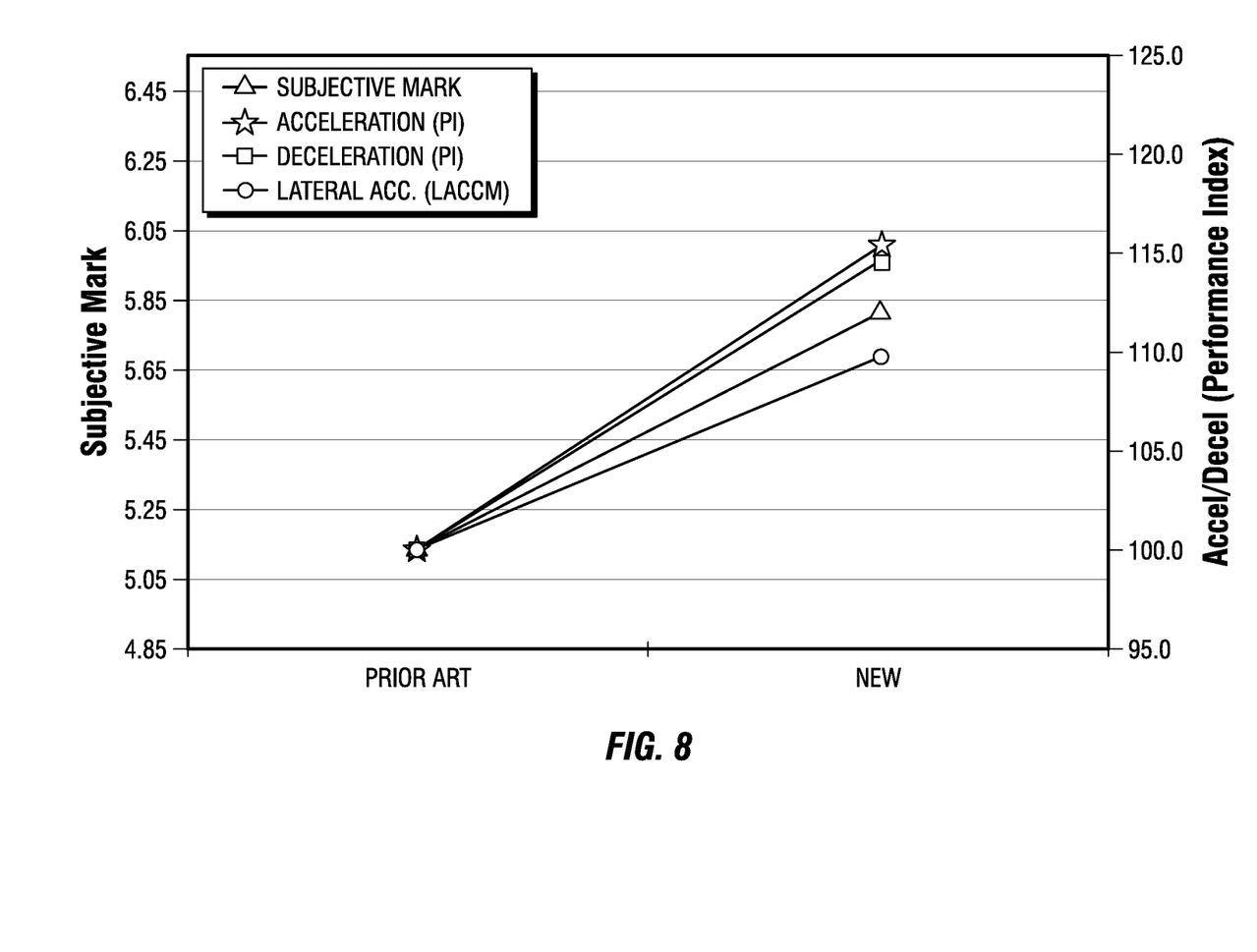
FIG. 8 is a chart showing tire performance improvement measures over the prior art.

By incorporating in combination the various features described herein, including the particularly characterized tread material, tread design employing a unique combination of features, and tire construction employing a particularly characterized cap layer, improvements in wear and snow performance were observed while also maintaining dry performance and cornering stiffness. In particular, with reference to the chart in FIG. 8, a notable improvement in snow performance is evidenced while dry performance is maintained. In particular, these tests were performed using the novel tire described herein, incorporating the tread design shown in FIG. 2 and the tire constructions shown and described in association with FIG. 4 against a prior art tire employing the tread design described in association with and shown in FIG. 3 and the prior art tire construction described herein. As a result, the novel tire described herein observed a 14.6% improvement in the SAE subjective gain in snow handling while also providing an approximately 18% improvement in acceleration, an approximately 16% improvement in deceleration, and an approximately 10% gain in lateral acceleration under snow conditions as measured objectively using accelerometers during vehicle testing along a testing course. During such testing, at least 5 laps along a road course were conducted by different drivers, where subjective snow handling measures were provided by the drivers according to SAE standards while accelerometers were used to measure acceleration, deceleration, and lateral accelerations along predefined segments along the testing course. The data was filtered and averaged to provide accurate results. In other testing, while wet performance was maintained, a 20% improvement in wear performance was observed. Also, in conducting cornering stiffness testing, the observed cornering stiffness resulted in a 3.5% gain, which established that while improving snow and wear performance, cornering stiffness was not sacrificed and instead observed a mild improvement.

To the extent used, the terms "comprising," "including," and "having," or any variation thereof, as used in the claims and/or specification herein, shall be considered as indicating an open group that may include other elements not specified. The terms "a," "an," and the singular forms of words shall be taken to include the plural form of the same words, such that the terms mean that one or more of something is provided. The terms "at least one" and "one or more" are used interchangeably. The term "single" shall be used to indicate that one and only one of something is intended. Similarly, other specific integer values, such as "two," are used when a specific number of things is intended. The terms "preferably," "preferred," "prefer," "optionally," "may," and similar terms are used to indicate that an item, condition or step being referred to is an optional (i.e., not required) feature of the embodiments. Ranges that are described as being "between a and b" are inclusive of the values for "a" and "b" unless otherwise specified.

While various improvements have been described herein with reference to particular embodiments thereof, it shall be understood that such description is by way of illustration only and should not be construed as limiting the scope of any claimed invention. Accordingly, the scope and content of any claimed invention is to be defined only by the terms of the following claims, in the present form or as amended during prosecution or pursued in any continuation application. Furthermore, it is understood that the features of any specific embodiment discussed herein may be combined with one or more features of any one or more embodiments otherwise discussed or contemplated herein unless otherwise stated.

What is claimed is:

1. A pneumatic tire comprising:
a pair of annular bead areas spaced apart axially along a rotational axis of the tire;
a pair of sidewalls spaced apart axially along the rotational axis of the tire, each sidewall of the pair of sidewalls extending outwardly in a radial direction from one bead area of the pair of bead areas relative to the rotational axis;
a crown portion arranged widthwise between the pair of sidewalls and extending annularly around the tire,
the crown portion including a tread formed of elastomeric material arranged annularly around the crown portion and forming an outer, ground-engaging side upon which the tire is intended to roll upon, the tread having a thickness extending radially and a width extending axially, the tread forming a wearing portion of the tire;
the crown portion further including one or more belt plies each forming a layer of elastomeric material reinforced with a plurality of elongate reinforcements spaced apart in an array, the one or more belt plies being arranged radially inward and below the tread;
the crown portion further including a pair of shoulders, each shoulder forming a portion of the crown arranged adjacent to each sidewall,
the crown portion further including a cap ply arranged radially outward from the one or more belt plies and between the tread and the one or more belt plies, the cap ply extending at least partially across a full width of at least one of the belt plies and being arranged at least partially within each shoulder, the cap ply forming a layer of elastomeric material reinforced with a plurality of elongate reinforcements spaced apart in an array, the cap ply being characterized as having a rupture force greater than 210 N per 15 mm of cap ply width;
the tread including a plurality of tread features extending a depth within the tread thickness which includes lateral sipes, lateral grooves, and longitudinal grooves, the longitudinal grooves arranged to form a plurality of ribs, each rib extending annularly around the tread and where adjacent ribs are separated by one of the longitudinal grooves, the plurality of ribs including a pair of shoulder ribs and a plurality of central ribs, each of the shoulder ribs arranged along one of opposing widthwise extents of the outer, ground-engaging side and within one of the shoulders and where the plurality of central ribs are arranged between the pair of shoulder ribs;
the plurality of tread features extending into the tread thickness substantially to a depth defining a skid depth of the tread, the skid depth being the thickness of the tread intended to be worn during the intended life of the tire tread;

where one of the shoulder ribs includes an elongate compliance feature comprising a groove or a sipe, the elongate compliance feature extending primarily in a circumferential direction of the tire and into the tread thickness to a depth equal to or less than 75% of the skid depth of the tread at the location of the elongate compliance feature;

where for the outer, ground-engaging side, the lateral sipes and lateral grooves are arranged to provide an average lateral feature spacing of less than 15 mm;

where an average inclination angle for the lateral grooves is greater than 6 degrees in the shoulder ribs and is greater than 20 degrees in the central ribs;

where a longitudinal non-lateral sipe edge density for all lateral grooves, longitudinal grooves, and the elongate compliance feature is greater than 21.1 micrometers/$mm^2$;

where a longitudinal lateral sipe edge density for all lateral sipes is greater than 5.5 micrometers/$mm^2$.

2. The tire of claim 1, where the tread being substantially formed of an elastomeric material characterized as having a glass transition temperature of −25° C. to −10° C., a tan delta of 0.4 to 0.6, a dynamic shear modulus of 1.0 to 1.4 MPa, a Mooney viscosity of 80 to 120, and a modulus of elongation (MA10) of 5.75 to 9.5.

3. The tire of claim 1, where each of the inner and outer shoulder ribs have a width equal to 24% to 29% of the tread width.

4. The tire of claim 1, where the average inclination angle for the lateral grooves is greater than 8 to 14 degrees in the shoulder ribs and is greater than 30 to 45 degrees in the central ribs.

5. The tire of claim 1, where the longitudinal non-lateral sipe edge density is 28 to 45 micrometers/$mm^2$.

6. The tire of claim 1, where the longitudinal lateral sipe edge density is 7 to 11 micrometers/$mm^2$.

7. The tire of claim 1, where the tire tread is characterized as having a longitudinal contact surface ratio of 0.75 to 0.80.

8. The tire of claim 1, where a width of each inner and outer shoulder rib has a width equal to 150% to 170% of an average width of the central ribs.

9. The tire of claim 1, where the average lateral feature spacing is 12 mm to 14.5 mm.

10. The tire of claim 1, where the one or more belt plies forms a pair of belt plies.

11. The tire of claim 1, where the rupture force of the cap ply is 310 to 410 N per 15 mm of width.

12. The tire of claim 1, where a total volumetric void in the tread in an unworn state is 0.3 to 0.33.

13. The tire of claim 1, where the elongate compliance groove is 1 to 3 mm wide and the depth of the elongate compliance groove depth is 25% to 75% of a skid depth of the tread, the skid depth extending into the tread depth to the depth of the deepest circumferential groove.

14. The tire of claim 1, where the cap ply extends substantially across the width of each of the one or more belt plies.

15. The tire of claim 14, where the cap ply is formed of a strip wound helically around the tire in an abutting configuration.

16. The tire of claim 1, where, when adding all lateral sipe length together to form a total combined lateral sipe length, at least 50% of the total combined lateral sipe length is chamfered along the outer, ground-engaging surface.

17. The tire of claim 16, where the chamfers extend into the tread depth a distance of 1.5 mm and extend perpendicular to a length of the lateral sipe by 1.5 mm.

* * * * *

UNITED STATES PATENT AND TRADEMARK OFFICE
CERTIFICATE OF CORRECTION

PATENT NO. : 11,623,478 B2
APPLICATION NO. : 16/959056
DATED : April 11, 2023
INVENTOR(S) : Patrick Jon Buresh et al.

Page 1 of 1

It is certified that error appears in the above-identified patent and that said Letters Patent is hereby corrected as shown below:

On the Title Page

Column 1, item (71), "Applicant: COMPAGNIE GENERALE DES ETABLISSMENTS MICHELIN, Clermont-Ferrand (FR)", should read --Applicant: COMPAGNIE GENERALE DES ETABLISSEMENTS MICHELIN, Clermont-Ferrand (FR)--

Column 1, item (73), "Assignee: COMPAGNIE GENERALE DES ETABLISSMENTS MICHELIN, Clermont-Ferrand (FR)", should read --Assignee: COMPAGNIE GENERALE DES ETABLISSEMENTS MICHELIN, Clermont-Ferrand (FR)--

Signed and Sealed this
Thirtieth Day of April, 2024

Katherine Kelly Vidal
*Director of the United States Patent and Trademark Office*